United States Patent
Akopian

(10) Patent No.: US 7,277,476 B2
(45) Date of Patent: *Oct. 2, 2007

(54) DETERMINING THE CORRELATION BETWEEN RECEIVED SAMPLES AND AVAILABLE REPLICA SAMPLES

(75) Inventor: David Akopian, Tampere (FI)

(73) Assignee: Nokia Siemens Network Oy, Espoo (FI)

( * ) Notice: Subject to any disclaimer, the term of this patent is extended or adjusted under 35 U.S.C. 154(b) by 749 days.

This patent is subject to a terminal disclaimer.

(21) Appl. No.: 10/406,152

(22) Filed: Apr. 1, 2003

(65) Prior Publication Data

US 2004/0196895 A1    Oct. 7, 2004

(51) Int. Cl.
*H04B 1/707* (2006.01)
(52) U.S. Cl. .................... 375/150; 375/343
(58) Field of Classification Search .......... 375/150, 375/152, 142, 343, 130, 140, 147, 316, 340
See application file for complete search history.

(56) References Cited

U.S. PATENT DOCUMENTS

| | | | |
|---|---|---|---|
| 6,055,899 A | 5/2000 | Feit et al. | 92/154 |
| 6,366,938 B1 | 4/2002 | Levison et al. | 708/422 |
| 6,831,956 B1 * | 12/2004 | Schmidl et al. | 375/343 |

* cited by examiner

*Primary Examiner*—Kevin Burd
(74) *Attorney, Agent, or Firm*—Ware, Fressola, Van Der Sluys & Adolphson, LLP

(57) ABSTRACT

The invention relates to a method, a processing unit and a system for determining the correlation between samples of a received code modulated signal and samples of replica code sequences. In order to simplify and accelerate the process, it is proposed that the received samples and the replica samples are aligned to each other and that the positions of the samples in the received signal and in the replica code sequences are grouped, each group comprising all positions at which the composition of the values of the samples of all of the replica code sequences is similar. The values of the received samples which are associated to a respective group are combined separately for each group to obtain a respective preliminary result. Then, a correlation value is determined for each replica code sequence by combining the preliminary results obtained for all groups separately for each replica code sequence, taking into account the values of the samples of the replica sequences in the respective group.

16 Claims, 5 Drawing Sheets

DETERMINING THE CORRELATION BETWEEN RECEIVED SAMPLES AND AVAILABLE REPLICA SAMPLES

FIELD OF THE INVENTION

The invention relates to a method, a processing unit and a system for determining the correlation between samples of a code modulated signal received at a receiver and samples of at least one available replica code sequence.

BACKGROUND OF THE INVENTION

The correlation between a code modulated signal received at a receiver and an available replica code sequence has to be determined for example in CDMA (Code Division Multiple Access) spread spectrum communications.

For a spread spectrum communication in its basic form, a data sequence is used by a transmitting unit to modulate a sinusoidal carrier and then the bandwidth of the resulting signal is spread to a much larger value. For spreading the bandwidth, the single-frequency carrier can be multiplied for example by a high-rate binary pseudo-random noise (PRN) code sequence comprising values of −1 and 1, which code sequence is known to a receiver. Thus, the signal that is transmitted includes a data component, a PRN component, and a sinusoidal carrier component. A PRN code period comprises typically 1023 chips, the term chips being used to designate the bits of the code conveyed by the transmitted signal, as opposed to the bits of the data sequence.

A well known system which is based on the evaluation of such code modulated signals is GPS (Global Positioning System). In GPS, code modulated signals are transmitted by several satellites that orbit the earth and received by GPS receivers of which the current position is to be determined. Each of the satellites transmits two microwave carrier signals. One of these carrier signals L1 is employed for carrying a navigation message and code signals of a standard positioning service (SPS). The L1 carrier signal is modulated by each satellite with a different C/A (Coarse Acquisition) Code known at the receivers. Thus, different channels are obtained for the transmission by the different satellites. The C/A code, which is spreading the spectrum over a 1 MHz bandwidth, is repeated every 1023 chips, the epoch of the code being 1 ms. The carrier frequency of the L1 signal is further modulated with the navigation information at a bit rate of 50 bit/s. The navigation information, which constitutes a data sequence, can be evaluated for example for determining the position of the respective receiver.

A receiver receiving a code modulated signal has to have access to a synchronized replica of the employed modulation code, in order to be able to de-spread the data sequence of the signal. To this end, a synchronization has to be performed between the received code modulated signal and an available replica code sequence. Usually, an initial synchronization called acquisition is followed by a fine synchronization called tracking. In both synchronization scenarios, a correlator is used to find the best match between the replica code sequence and the received signal and thus to find their relative shift called code phase. The search can be performed with different assumptions on an additional frequency modulation of the received signal. Such an additional modulation may occur for example due to a Doppler effect and/or a receiver clock inaccuracy and be as large as +/−6 kHz. The phase of the received signal relative to the available replica sequence can have any possible value due to uncertainties in the position of the satellite and the time of transmission of the received signal.

A correlator aligns an incoming signal with a replica code sequence with different assumptions on the code-phase. The correlator then multiplies the elements element wise and integrates the resulting products to obtain a correlation value for each code-phase. If the alignment is correct, the correlation will be higher than in the case of a misalignment. Thus, the correlation peak is an indication of the correct code-phase.

Two main types of correlators have been suggested so far.

A first type of correlator performs a direct correlation of a replica sequence and the received signal in the time domain. This implies that a dedicated processing step is carried out for each possible correlation phase. In case there is a large number of correlation phases to check, the computational burden is significant, which is critical especially for software based receivers. It has been proposed to reduce the amount of calculations by combining the available replica code sequences and by searching the several satellites at the same time based on this combined replica code sequence. It is a disadvantage of this approach, however, that it reduces the sensitivity of the correlator.

There exist different implementation approaches for the first type of correlator. They may be formed in particular with matched filters or ordinary correlators. The matched filter, for instance, is based on a sliding approach. For each code-phase, a new fragment of an incoming signal, which is shifted versus a previous fragment, is correlated with available replica code sequences. Due to the computationally heavy operation, the first type of filters is often implemented in hardware.

A second type of correlator relies on frequency domain techniques employing Discrete Fourier Transforms (DFT), which enable a parallel processing for all possible correlation phases. Thus, the DFT based correlators enable a reduction of the computational burden, in particular if the DFTs are realized as Fast Fourier Transforms (FFT).

Nevertheless, the first type of correlator is still widely used. One reason for this is the simplicity of the implementation. While the FFT might be suited to reduce the complexity of the correlator, the use of FFT requires complicated algorithms. Moreover, the FFT approximates calculations due to the quantization of the transform coefficients. Another reason for further performing calculations in the time domain is that while in principle, the phase of the received signal relative to the available replica sequence can have any possible value, in some situations, the range of the possible correlation phases can be reduced based on some a-priori knowledge. Currently, however, a limited search of correlation phases can only be realized with correlators performing a correlation in the time domain. Known DFT based methods inherently perform the search of all possible correlation phases in parallel. Therefore, their usage is not feasible in situations in which the search is to be carried out only over a limited number of all possible correlation phases.

SUMMARY OF THE INVENTION

It is an object of the invention to reduce the computational load required for determining the correlation between samples of a received signal and samples of available replica sequences in the time domain.

It is in particular an object of the invention to reduce the computational load for such a process without reducing the sensitivity of the correlation.

It is further an object of the invention to accelerate the determination of a correlation.

A method is proposed for determining the correlation between samples of a code modulated signal received at a receiver and samples of at least one available replica code sequence. The samples of the received signal and of the at least one replica code sequence are aligned to each other. Further, the positions of the samples in the received signal and in the at least one replica code sequence are grouped, each group comprising all positions at which the composition of the values of the samples of all of the at least one replica code sequence is similar. The proposed method comprises as a first step combining the values of the samples of the received signal which are associated by their positions to a respective group separately for each group to obtain a respective preliminary result. As a second step, the proposed method comprises determining a correlation value for each of the at least one replica code sequence by combining the preliminary results obtained for all groups separately for each of the at least one replica sequence, taking into account the values of the samples of the at least one replica sequence in the respective group.

Further, a corresponding processing unit and a corresponding system are proposed, each comprising a first combining portion for generating the preliminary results and a second combining portion for determining the correlation values in accordance with the proposed method.

The proposed processing unit can be for instance a correlator, which may be included in a receiver or in some other unit which is able to communicate with the receiver. Alternatively, the processing unit can be given by the receiver itself or by some other unit which is able to receive at least the samples of the signal received by the receiver. The proposed system may comprise for example at least a receiver and a unit which is able on the one hand to communicate with the receiver and on the other hand to carry out the proposed method.

The invention is based on the consideration that in each available replica code sequence, the same sample values will occur several times. In case of several replica code sequences, also a particular composition of sample values of all replica code sequences at one position will usually occur various times. It is therefore proposed that similar compositions of replica code sequence samples are grouped by the positions of the samples. The received samples are first combined within the groups, i.e. those received samples which are at positions associated to the same group are combined to form preliminary results. These preliminary results can be for example subsums obtained by adding the respective samples, but equally other calculation results. The preliminary results can then be combined to form a correlation value for each replica code sequence with a significantly reduced processing effort.

It is an advantage of the invention that it is suited to increase the correlation processing speed several times without approximations and thus without a reduced sensitivity of the correlator. At the same time, the additional above mentioned problems arising with FFT implementations are avoided. In case several replica code sequences are available, the proposed approach allows processing them jointly by sharing common computations. In case of a satellite positioning system with a receiver which uses a 1023 sized matched filter, for example, the amount of calculations can be reduced to one fourth, if five or six satellites are searched at the same time, and thereby also the time to first fix can be decreased to one fourth.

While the invention proposes to share computations, it has an overall computational complexity which is almost the same as in the case of processing a single replica signal.

It is further an advantage of the invention that the complexity of the employed correlator can be reduced by sharing the same hardware and intermediate results for processing several replica code sequences. This will save resources and might even allow to avoid any need to use special hardware.

It is to be noted that the invention can be employed in particular for a parallel processing of different replica code sequences, but equally for accelerating the processing of a single replica code sequence. In the latter case, the replica code sequence is partitioned into sections forming at least two different groups, i.e. each composition of samples comprises only a single sample. The calculation of the correlation value is then the same as for one of several replica code sequences. The preliminary results for each group could also be combined in a way that it includes some Doppler frequency compensation.

The positions of the samples can be grouped in different ways. In a first preferred approach, each group comprises all positions at which the composition of the values of the samples of all replica code sequences is identical. In a second preferred approach, each group comprises all positions at which the composition of the differences between the values of the samples of all replica code sequences except for one selected replica code sequence and the value of the sample of the selected replica code sequence is identical. When combining the preliminary results for obtaining the correlation value for a particular replica code sequence, the way in which the groups are formed has to be taken into account.

The invention can moreover be employed with any type of code, since it is possible to form groups with similar replica samples for any code. A particularly simple processing is obtained for binary codes, for example in the case of a BPSK (binary phase shift keying) modulation of the received signals, where the received samples and the samples of the replica code sequences have values of (−1, +1). In the latter case, each received sample has to be multiplied either to +1 or −1 in the correlation process. With K replica code sequences, there are e.g. $2^K$ groups of replica samples with the same sign distribution for all replica code sequences at a specific sample position, or e.g. $2^{K-1}$ groups of replica samples with the same distribution of sign changes compared to the sample of a selected one of the replica code sequences at a specific sample position. Since samples received for each of the groups are combined first within their groups, and the outputs of this operation are then combined differently for each replica code sequence, several replica code sequences are processed with the computational effort of one.

The invention may be used in acquisition and tracking for determining the code phase and the frequency of a remaining complex sinusoidal modulation of a received signal, i.e. of the sinusoidal modulation which remains after the carrier has been wiped off from the received signal based on the known nominal carrier frequency. The code phase is determined according to the peaks of a cross-correlation function, the correlation being calculated at initial code wipe-off stages. The processing for weak signals requires additional coherent and non-coherent integrations. The invention can therefore also be used as a building block for other methods implementing different scenarios of coherent and/or non-coherent processing for possible multiple frequency candidates.

The invention can be implemented in hardware or in software. The invention can be implemented in particular in accordance with the implementation of the employed correlator.

The invention can further be employed in particular, though not exclusively, for CDMA spread spectrum receivers, for instance for a receiver of a positioning system like GPS or Galileo.

The receiver can be for example a part of a mobile phone, and it can be for example inside the mobile phone. This means that the receiver can be for example a separate module or be implemented for example inside the mobile phone. However, the receiver does not have to be combined with a mobile phone. It can be for instance as well a normal GPS receiver which does not have a phone inside the same device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE INVENTION

Two exemplary embodiments of the invention will be described which are implemented in a receiver of a GPS system.

In both embodiments, the receiver stores a plurality of replica code sequences, each replica code sequence corresponding to the code sequence employed by a respective satellite of the GPS system. Alternatively, the replica samples could be generated in real-time. When the receiver receives a satellite signal, the known or assumed carrier frequency is wiped off from the received signal, and a set of consecutive samples is stored in addition in a memory of the receiver. The GPS system uses BPSK (binary phase shift keying) PRN codes consisting of only +/−1. Therefore, the stored samples of the received signal constitute a binary sequence, and accordingly also the stored replica code sequences are binary sequences.

In the receiver, further a matched filter algorithm is implemented for calculating the correlation between the currently stored samples of a received signal and the available replica code sequences, to which the received samples are aligned. This process will be explained in more detail below. When correlation values have been determined by the matched filter for the currently stored set of received samples on the one hand and all replica code sequences on the other hand, a new sample of the received signal is added in the memory to the stored set of samples and the oldest stored sample is removed. The matched filter then determines correlation values for the new set of samples of the received signal on the one hand and all available replica code sequences on the other hand. This process is continued for all searched code phases. The highest correlation value obtained in this process identifies the satellite by which the received signal was transmitted and the code phase the received signal has.

Figure 1:
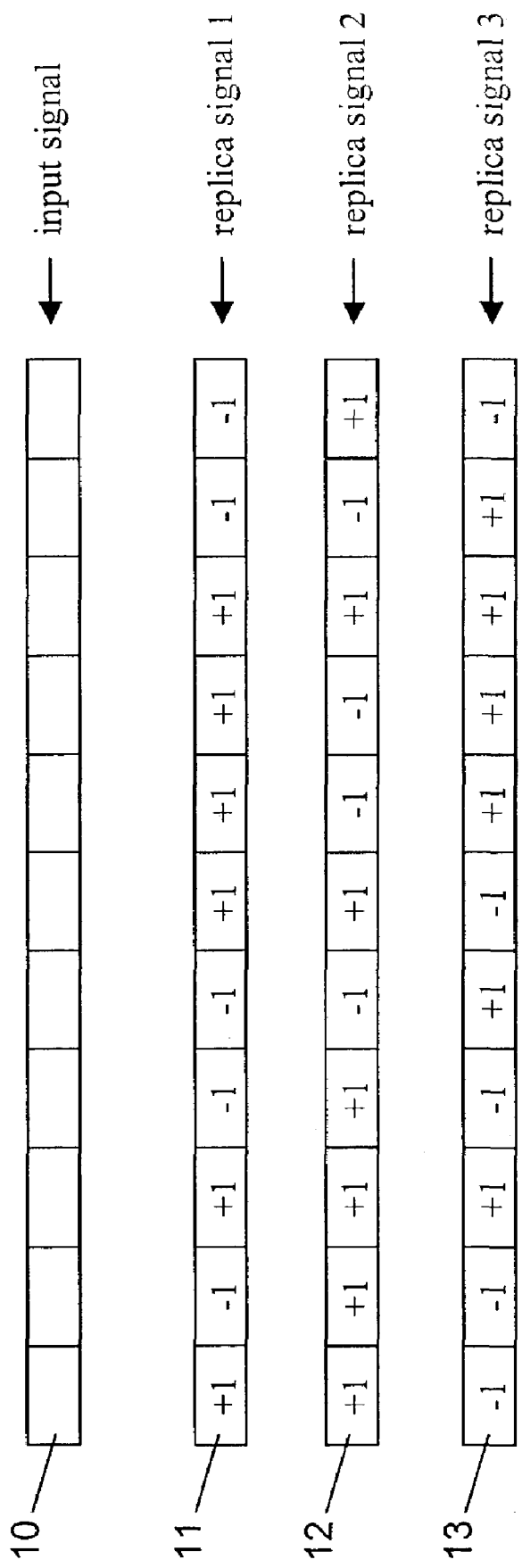
FIG. 1 illustrates an exemplary distribution of sample values in three replica code sequences.

FIG. 1 illustrates the alignment of received samples and the samples of three replica sequences.

A first row 10 presents samples of a received signal, which are stored in the memory of the receiver. A second row 11 presents samples of a first replica code sequence stored in the memory of the receiver. A third row 12 presents samples of a second replica code sequence stored in the memory of the receiver. A fourth row 13 presents samples of a third replica code sequence stored in the memory of the receiver. While the signs of the stored samples of a received signal change, the sign usage for each sample of the stored replica code sequences is known to the receiver.

The first embodiment of the invention will now be described with reference to FIGS. 2 and 3.

Figure 2:
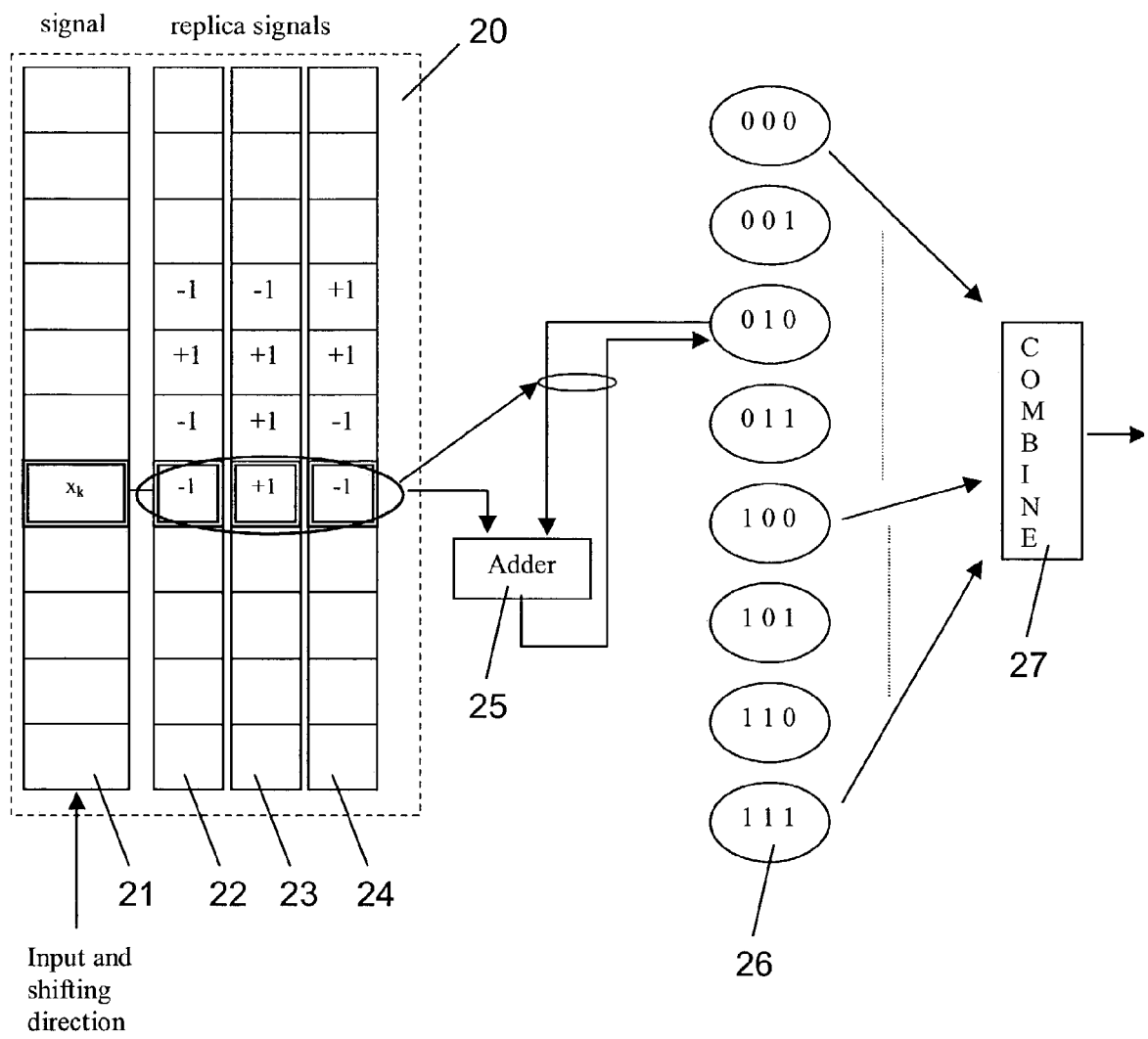
FIG. 2 is a diagram illustrating a first embodiment of the invention.

FIG. 2 illustrates the structure of the receiver in which the first embodiment of the invention is implemented. The receiver enables a matched filter operation based on three available replica code sequences. FIG. 3 is a flow chart illustrating a corresponding parallel matched filter algorithm.

On the left hand side of FIG. 2, a memory 20 of the receiver is indicated with dashed lines. The memory comprises a first portion 21 depicted as a first vertical row for storing samples of received signals. The memory moreover comprises three further portions 22-24 depicted as three further vertical rows for storing the samples of three different replica code sequences. The memory 20 is connected via an adder 25 to a register bank 26 having eight registers. The register bank 26 is connected in addition to a combining section 27.

The number of registers in the register bank 26 corresponds to the number of possible compositions of samples at the same position of the different replica sequences. The signs of the replica samples at the same position within the available replica code sequences are coded for each possible composition as binary numbers, where '0' stands for a negative sign while '1' indicates a positive sign. An exemplary binary word of (01010) would thus describe one possible composition of signs for five replica code sequences, in which the samples of the $1^{st}$, $3^{rd}$ and $5^{th}$ sequence at a specific position are −1, while the samples of the $2^{nd}$ and $4^{th}$ sequence at the same specific position are +1. The more replica code sequences are used, the more compositions are possible. If K replicas are used, then the resulting binary words will consist of K bits and the number of possible different compositions are $2^K$.

For the example of FIG. 2, which is based on three available replica code sequences, there will be eight possible compositions and thus eight different possibly binary words:

(000), (001), (010), (011), (100), (101), (110), (111)

Thus, the register bank 26 comprises eight registers. Each of these registers can be addressed by a respective one of the eight possible binary words.

For performing the matched filter operation, samples of the received signal are input from below (as shown in the figure) to the first memory portion 21 and shifted for each matched filter iteration upwards by one sample. For the current matched filter iteration, the stored received signal samples are denoted as:

$x_{N-1}, x_{N-2}, \ldots, x_3, x_2, x_1, x_0$ where N is the number of samples.

Each portion 22-24 for the replica code sequences comprises a fixed set of samples denoted in an analogous way as:

$r_{N-1}^k, r_{N-2}^k, \ldots, r_3^k, r_2^k, r_1^k, r_0^k$ where $k=1, \ldots, K$ identifies the respective replica code sequence. In the example of FIG. 2, k is equal to 1, 2 or 3.

In a conventional matched filter operation, the samples of the received signal are multiplied elementwise to samples of the replica code sequences and the resulting products are integrated for obtaining correlation values $C^k$ for the particular iteration and thus the particular code phase according to the equation:

$$C^k = \sum_{j=0}^{N-1} r_j^k x_j$$

Compared to this conventional approach, the matched filter operation according to the first embodiment of the invention results in the same correlation values $C^k$ with a reduced amount of processing.

Corresponding to the above identified $2^K$ possible binary words (000) to (111) for addressing the registers, $2^K$ groups of K samples with different "sign" usage are defined, which are denoted as $J_{b_1 \ldots b_K}$, $b_1 \ldots b_K$ as the notation of signs for a respective group. In the embodiment of FIG. 2, there are thus eight groups $J_{-1-1-1}$ to $J_{+1+1+1}$, each identifying another group of samples with a specific sign usage.

The position j is defined to belong to a specific one of the groups $J_{b_1 \ldots b_K}$, if the value of the samples at position j of the K replica code sequences correspond to the values of $b_1 \ldots b_K$ of this group, i.e. $j \in J_{b_1 \ldots b_K}$, if $(r_j^0 r_j^1 \ldots r_j^K) = (b_1, \ldots, b_K)$.

Now, subsums of samples $S_m$ are calculated in each group according to the equation:

$$S_m = \sum_{j \in J_{b_1 \ldots b_K}} x_j,$$

where $m = (m_1, \ldots, m_K) = 0, 1, \ldots, 2^K - 1$ is reserved for indexing the groups $J_{b_1 \ldots b_K}$, with $$m_p = \begin{cases} 1 & b_p = 1 \\ 0 & b_p = -1 \end{cases}$$

and $p = 1 \ldots K$.

In the example of FIG. 2, the index m thus corresponds to a respective one of the above listed eight binary words (000) to (111) having the values 0 to 7. The index m thereby associates the respective subsum $S_m$ to one of the eight different groups $J_{b_1 \ldots b_K}$.

For calculating the subsum $S_m$ for each group in a new matched filter iteration, the matched filter algorithm in the receiver of FIG. 2 first initializes the value in each of the $2^K$ registers of the register bank 26 to zero. Each of the register values constitutes the current value of one of the subsums $S_m$, the index m identifying the respective register. This is indicated as step 301 of FIG. 3.

Then, the matched filter algorithm processes the stored received samples $x_j$ one after the other for forming the subsums $S_m$. In FIG. 2, one of the received samples is denoted with $x_n$. This sample $x_n$ is provided to the adder 25. The samples of the three replica code sequences having the same index n are $r_n^1 = -1$, $r_n^2 = +1$, $r_n^3 = -1$. These samples are converted into a register address (010) by using a '0' for each negative sign and a '1' for each positive sign. The obtained register address is used for retrieving the current value of the subsum $S_m$ for the corresponding group, i.e. $S_{(010)}$ or $S_2$, from one of the registers of the register bank 26. This subsum $S_m$ is equally provided to the adder 25. The adder 25 adds the received value $x_n$ to the received sum $S_2$ and stores the new sum $S_2$ into the addressed register of the register bank 26 again. This is indicated in FIG. 3 as step 302.

This procedure is performed analogously for all N received samples which are currently stored in the first portion 21 of the memory 20.

The combining unit 27 of FIG. 2 then combines all stored subsums $S_m$ with the values within the different groups to obtain the K correlation values $C^k$.

For the $k^{th}$ replica code sequence, with $k=1, \ldots, K$, the correlation value is determined according to the equation:

$$C^k = \sum_{m=0}^{2^K-1} b_k S_m$$

where for a respective value of m with $m = (m_1, \ldots, m_K)$, $b_k$ is defined to be $$b_k = \begin{cases} 1 & m_k = 1 \\ -1 & m_k = 0 \end{cases}$$

for the $k^{th}$ replica code sequence $k=1, \ldots, K$. Thus, the value of $b_k$ depends on the replica code sequence k and on the group m for which it is needed in the sum.

In the example of FIG. 2, a dedicated correlation value $C^1$, $C^2$, $C^3$ has to be calculated for K=3 replica code sequences, and the number of groups is eight. The sum in the equation for calculating a respective correlation value thus runs from m=0 to m=7. In the third term of the sum, for instance, m is equal to 2 and corresponds as binary word to $m = (m_1, m_2, m_3) = (010)$. For the first replica code sequence, k is equal to 1 and therefore $m_k = m_1 = 0$. As consequence, $b_k$ is equal to $-1$. Thus, the third term of the sum for calculating the correlation value $C^1$ for the first replica code sequence is $b_k S_m = (-1) \cdot S_2$. The other terms of the sum are determined analogously for each of the replica code sequences.

Figure 3:
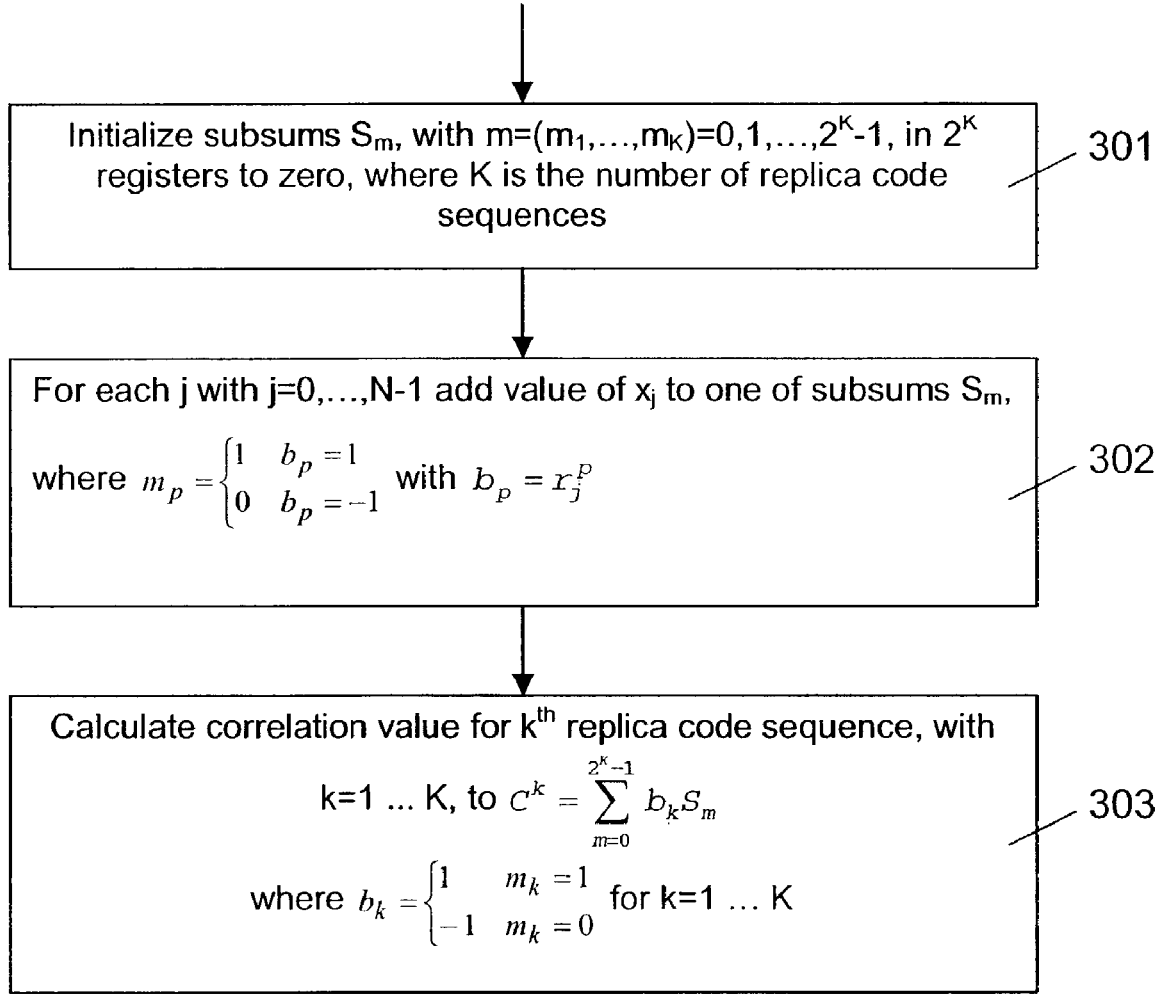
FIG. 3 is a flow chart illustrating the first embodiment of the invention.

The calculation of the correlation value $C^k$ for each replica code sequence by the matched filter algorithm is indicated in FIG. 3 as step 303.

Figure 4:
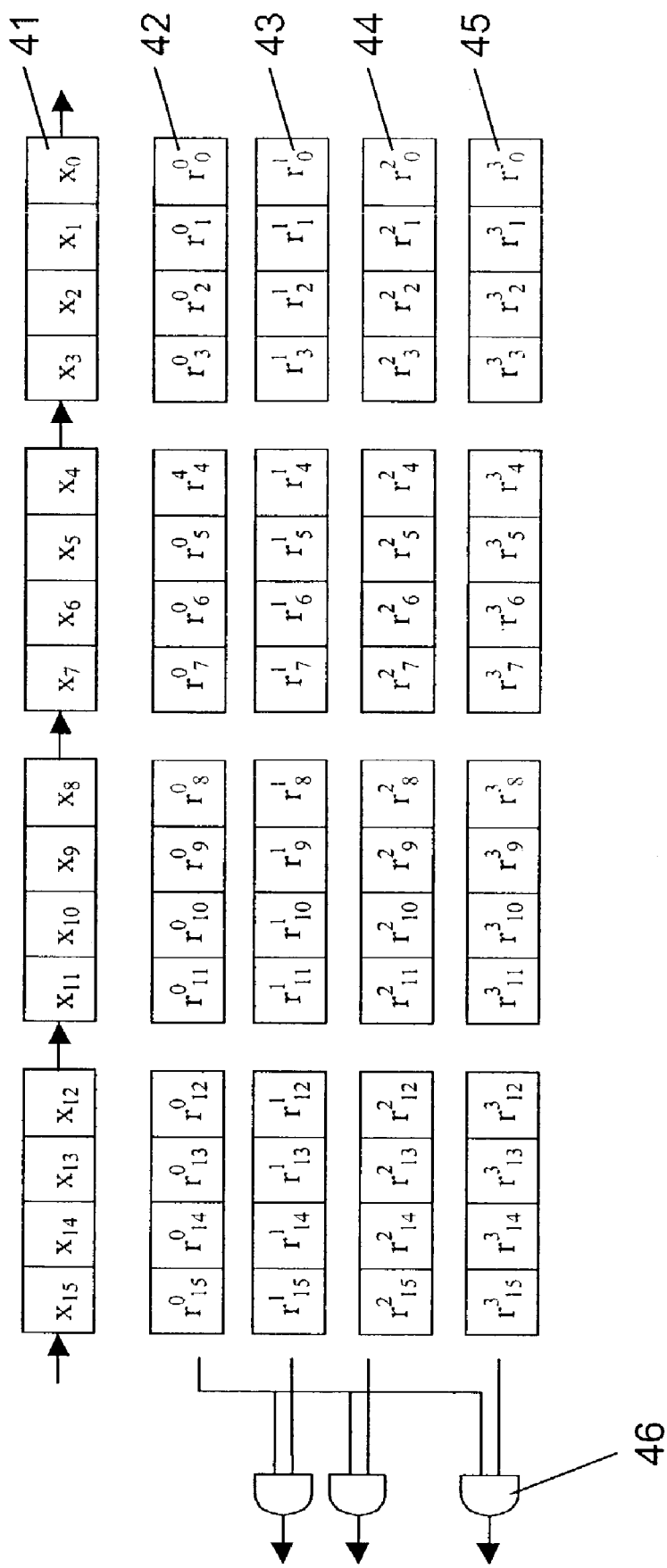
FIG. 4 is a diagram illustrating a second embodiment of the invention.
Figure 5:
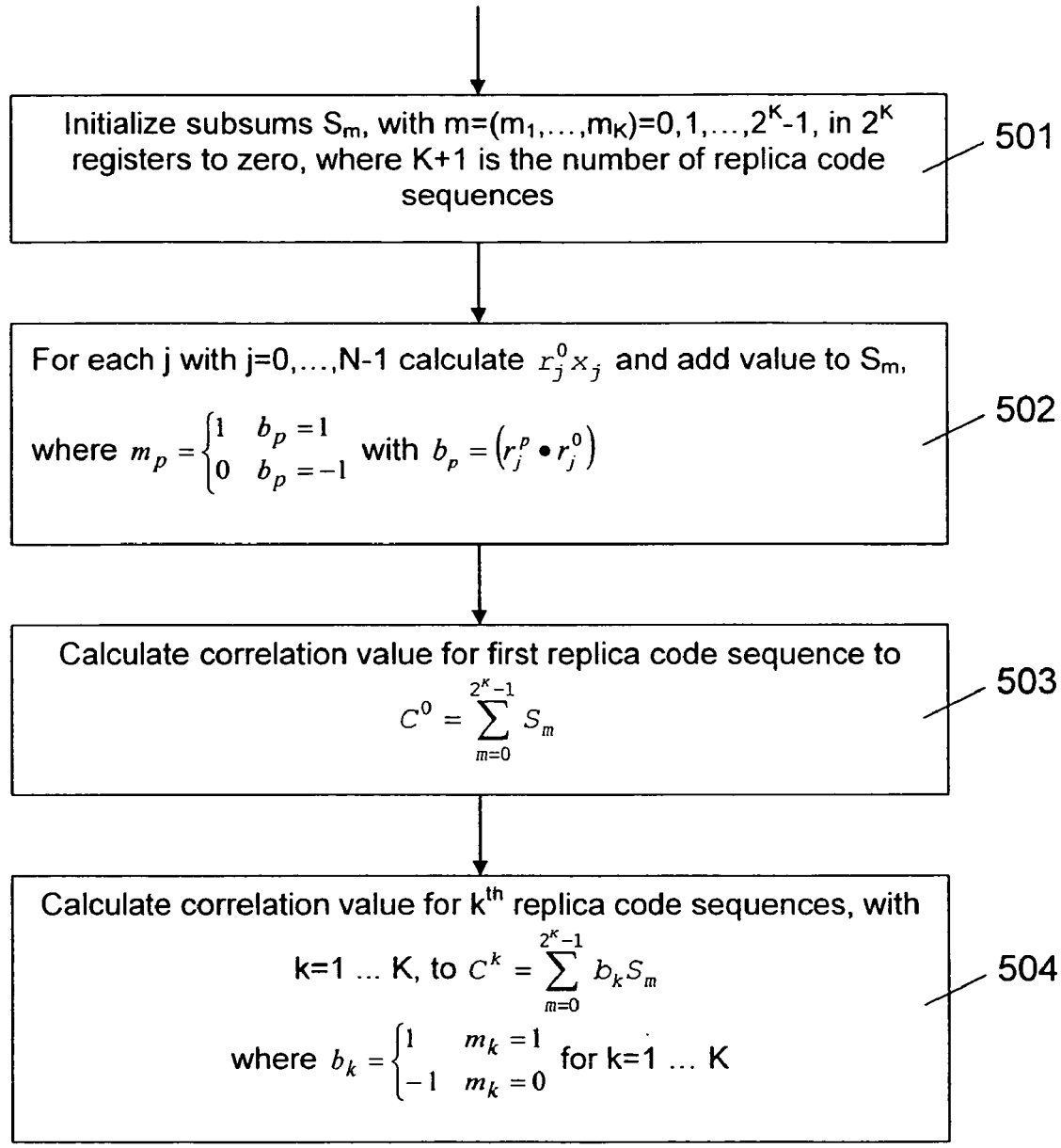
FIG. 5 is a flow chart illustrating the second embodiment of the invention.

The second embodiment of the invention will now be described with reference to FIGS. 4 and 5. FIG. 4 illustrates the difference of the receiver in which the second embodiment of the invention is implemented to the receiver of FIG. 2, while FIG. 5 is a flow chart illustrating a parallel matched filter algorithm for the second embodiment of the invention.

The structure of the receiver of the second embodiment is similar as depicted in FIG. 2, i.e. it comprises a memory for storing samples of received signals and fixed samples of replica code sequences, an adder, a register bank and a combining unit. In the second embodiment of the invention, however, the memory stores four replica code sequences instead of three. Moreover, the functioning of the components differs somewhat from the functioning of the components of the receiver of FIG. 2.

FIG. 4 shows a first horizontal row, which represents a first portion 41 of the memory of the receiver. In this first portion 41, samples of a signal received at the receiver are stored. The received samples enter the first memory portion 41 from the left hand side. The currently stored samples of the received signal are to be used in one matched filter iteration. They are denoted in general terms with $x_{N-1}$, $x_{N-2}, \ldots, x_3, x_2, x_1, x_0$, where N is equal to 16 in the example of FIG. 4.

FIG. 4 shows four further horizontal rows, which represent four further portions 42-45 of the memory of the receiver. In these further portions 42-45, samples of four replica code sequences are stored. The replica samples are aligned with the stored received samples. The samples of the replica code sequences are denoted in general terms with $r^{k}_{N-1}, r^{k}_{N-2} \ldots, r^{k}_3, r^{k}_2, r^{k}_1, r^{k}_0$, where k=0, ..., k=0 being reserved for the first replica code sequence. In the example of FIG. 4, K is equal to three. An XOR logic 46 is connected to portions 42-45 of the memory.

The number of registers of the register bank corresponds to the number of possible compositions of sign changes when comparing a sample at a specific position of a first replica signal to a sample at the same position of a respective one of the further replica signals. More specifically, the sign changes in the samples of the further replica code sequences are coded for each possible composition as binary numbers, where '0' stands for no change of sign while '1' indicates a change of sign compared to the sample at the same position of the first replica code sequence. An exemplary binary word of (01010) would thus describe a possible composition of sign changes for six available replica code sequences, in which the samples of the $2^{st}$, $4^{rd}$ and $6^{th}$ sequence at a specific position are equal to the sample of the $1^{st}$ sequence at the same position, while the sampled of the $3^{nd}$ and $5^{th}$ sequence at this position are different from the sample of the $1^{st}$ sequence at this position. The more replica code sequences are used, the more compositions of sign changes are possible. If K+1 replica code sequences are used, then the binary words will consist of K bits and the number of possible different compositions are $2^K$. For the example of FIG. 4, which is based on four available replica code sequences, there will be eight possible compositions of sign changes and thus eight different possible binary words:

(000), (001), (010), (011), (100), (101), (110), (111)

Thus, the register bank comprises eight registers. Each of these registers can be addressed by another one of the eight possible binary words.

As mentioned above, in a conventional matched filter operation, the correlation values $C^k$ are calculated according to the equation:

$$C^k = \sum_{j=0}^{N-1} r^k_j x_j$$

Also in the matched filter operation according to the second embodiment of the invention, the amount of processing required for obtaining the correlation values $C^k$ is reduced without approximations.

Corresponding to the above identified $2^K$ possible binary words (000) to (111) for addressing the registers, $2^K$ groups of K samples with different "sign" changes are defined, which are denoted as $J_{b_1 \ldots b_K}$. $b_1 \ldots b_K$ is the notation of sign changes with respect to the first replica code sequence for a respective group, i.e. $b_p = (r^p_j \bullet^0_j)$ with p=1 ... K. In the second embodiment illustrated in FIG. 4, there are thus eight groups $J_{-1-1-1}$ to $J_{+1+1+1}$, each identifying a group of samples with similar sign change behavior.

The position j is defined to belong to a specific one of the groups $J_{b_1 \ldots b_K}$, if the sign changes of the samples at position j of the K last replica code sequences compared to the sample at position j of the first replica code sequence correspond to the values of $b_1 \ldots b_K$ of this group, i.e. $j \in J_{b_1 \ldots b_K}$ if $(r^0_j r^1_j \ldots r^K_j) = \pm(1, b_1, \ldots, b_K)$.

Now, subsums of samples $S_m$ are calculated in each group according to the equation:

$$S_m = \sum_{j \in J_{b_1 \ldots b_K}} r^0_j x_j$$

where $m=(m1, \ldots, m_K)=0, 1, \ldots, 2^K-1$ is reserved for indexing the groups $J_{b_1 \ldots b_K}$ with $$m_p = \begin{cases} 1 & b_p = 1 \\ 0 & b_p = -1 \end{cases}$$

and p=1 ... K.

Thus, in the example of FIG. 4, the index m corresponds to a respective one of the above listed eight binary words (000) to (111) having the values 0 to 7. The index m thereby associates the respective sum $S_m$ to one of the eight different groups $J_{b_1 \ldots b_K}$.

For calculating the sum $S_m$ for each group for a new matched filter iteration, also the matched filter algorithm of the second embodiment first initializes the values in each of the $2^K$ registers to zero. Each of the register values constitutes the current value of one of the subsums $S_m$, the index m identifying the respective register. This is indicated as step 501 of FIG. 5.

Then, the matched filter algorithm processes the stored received samples $x_j$ one after the other for forming the subsums $S_m$.

To this end, a respective stored received samples $x_j$ is multiplied with the sample $r^0_j$ of the first replica code sequence at the same position j. The product is provided to the adder.

Further, a register address is generated by combining the sample of the first replica code sequence separately with each of the samples of the further replica code sequence at position j. In the example of FIG. 4, this is achieved by means of the XOR logic 46. The XOR logic 46 outputs a value '0' for each sample of the second to fourth replica code sequence at position j which is equal to the sample of the first replica code sequence at position j and a '1' for each sample of the second to fourth replica code sequence at position j which is different from the sample of the first replica code sequence at position j. The samples of the four replica code sequences having the same index may be for example $r_j^0=+1, r_j^2=+1, r_j^2=-1, r_j^3=+1$. These samples are converted by the XOR logic 46 into a register address (010). An XOR logic is not required in case hardwired connections are used between the memory and the register bank.

The obtained register address is used for retrieving the current value of the subsum $S_m$ for the corresponding group, e.g. $S_{(010)}$ or $S_2$, from the associated register of the register bank. This subsum $S_m$ value is equally provided to the adder. The adder adds the received product $r_j^0 x_j$ to the received subsum $S_m$ and stores the new subsum $S_m$ into the addressed register of the register bank again. Generating the subsums $S_m$ is indicated in FIG. 5 as step 502.

This procedure is performed analogously for all N received samples $x_j$ which are currently stored in the first portion of the memory of the receiver.

The combining unit of the receiver then combines all stored subsums $S_m$ to obtain the desired K correlation values $C^k$.

For the first replica code sequence, the correlation value $C^0$ is simply calculated as the sum of all subsums $S_m$:

$$C^0 = \sum_{m=0}^{2^K-1} S_m$$

This is indicated in FIG. 5 as step 503.

For the $k^{th}$ replica code sequence, with k=1, . . . ,K, the respective sign change in each group is taken into account. The correlation value $C^k$ is calculated to be:

$$C^k = \sum_{m=0}^{2^K-1} b_k S_m,$$

where for a respective value of m with m=$(m_1, \ldots, m_K)$, $b_k$ is defined to be $$b_k = \begin{cases} 1 & m_k = 1 \\ -1 & m_k = 0 \end{cases}$$

for the $k^{th}$ replica code sequence k=1, . . . ,K. Thus, the respective value of $b_k$ depends again on the replica code sequence k and on the group m for which it is needed in the sum.

The calculation of the correlation values $C^k$ for the last K replica code sequences, which corresponds to the calculation of the K correlation value $C^k$ in the first embodiment, is indicated in FIG. 5 as step 504.

With the two above described exemplary embodiments, it becomes apparent that it is not necessary to compute a matched filter result for each replica code sequence using all the received signal samples. It is sufficient to calculate once a subsum for various groups of received signal samples, and then to combine these subsums differently. Since the subsums can be the same for all replica code sequences, a reduction of the computational load can be achieved.

While there have shown and described and pointed out fundamental novel features of the invention as applied to a preferred embodiment thereof, it will be understood that various omissions and substitutions and changes in the form and details of the devices and methods described may be made by those skilled in the art without departing from the spirit of the invention. For example, it is expressly intended that all compositions of those elements which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for determining a correlation between samples of a code modulated signal received at a receiver and samples of at least one available replica code sequence, the samples of said received signal and of said at least one replica code sequence being aligned to each other, wherein positions of said samples in said received signal and in said at least one replica code sequence are grouped, each group comprising all positions at which composition of values of the samples of all of said at least one replica code sequence is similar, said method comprising:

combining the values of the samples of said received signal which are associated by their positions to a respective group separately for each group to obtain a respective preliminary result;

determining a correlation value for each of said at least one replica code sequence by combining obtained preliminary results for all groups separately for each of the at least one replica sequence taking into account the values of the samples of said at least one replica sequence in the respective group; and using said correlation value for each of said at least one replica code sequence to determine the correlation between each of said at least one replica code sequence and samples of said received signal.

2. The method according to claim 1, wherein each group comprises all positions at which the composition of the values of the samples of all of said at least one replica code sequence is identical;

wherein the values of the samples of said received signal which are associated by their positions to a respective group are combined within each group by summing the values of the samples of said received signal within each group to obtain said preliminary result for each group; and wherein said preliminary results for all groups are combined separately for each of said at least one replica sequence by multiplying the value of the samples of a respective replica code sequence in a respective group with the preliminary result determined for this particular group and by summing the multiplication results for the respective replica code sequence for all groups.

3. The method according to claim 2, wherein the number of current samples of said received signal and the number of samples of each of said at least one replica code sequence is N, and wherein the number of available replica code sequences is K;

wherein the employed code is a binary code using sample values of +1 and −1, the current samples of said received signal being denoted as: $x_{N-1}, x_{N-2}, \ldots, x_3, x_2, x_1, x_0$ and the samples of said at least one replica code sequences being denoted as: $r_{N-1}^k, r_{N-2}^k, \ldots, r_3^k, r_2^k, r_1^k, r_0^k$ with k=1 to K;

wherein $2^K$ groups $J_{b_1 \ldots b_K}$ are defined, $b_1 \ldots b_K$ being the notation of signs of the sample of said at least one replica code sequence, which samples are associated by their position to a respective group, and wherein a sample of said received signal at a specific position j is associated to a specific group $J_{b_1 \ldots bK}$, if $(r_j^0 r_j^1 \ldots r_j^K) = (b_1, \ldots, b_K)$;

wherein said preliminary result for each group is determined to be $$S_m = \sum_{j \in J_{b_1 \ldots b_K}} x_j,$$

where $m = (m_1, \ldots, m_K) = 0, 1, \ldots, 2^K - 1$ is reserved for indexing the groups $J_{b_1 \ldots b_K}$ with $$m_p = \begin{cases} 1 & b_p = 1 \\ 0 & b_p = -1 \end{cases}$$

and p=1 ... K; and wherein for the $k^{th}$ replica code sequence, with k=1, ..., K, the correlation value is determined to be $$C^k = \sum_{m=0}^{2^K - 1} b_k S_m,$$

where for each $m = (m_1, \ldots, m_K)$, $b_k$ is defined to be $$b_k = \begin{cases} 1 & m_k = 1 \\ -1 & m_k = 0 \end{cases}$$

for said $k^{th}$ replica code sequence.

4. The method according to claim 1,
wherein said at least one replica code sequence comprises at least two replica code sequences;
wherein each group comprises all positions at which the composition of the differences between the values of the samples of all of said replica code sequences except for one selected replica code sequence and the value of the sample of said selected replica code sequence is identical;
wherein the values of the samples of said received signal which are associated by their positions to a respective group are combined within each group by multiplying the value of each sample at a particular position in said received signal with the value of the sample at said particular position in said selected replica code sequence, and by adding all resulting products within one group to obtain said preliminary result for each group;
wherein a correlation value for said selected replica code sequence is determined by summing the preliminary results of all groups; and
wherein a correlation value for any other replica sequence than said selected replica sequence is determined by combining the difference-between the value of the samples of the respective replica code sequence in a particular group and the value of the samples of the selected replica code signal in this particular group with the preliminary result determined for this particular group, and by summing the resulting values for all groups.

5. The method according to claim 4,
wherein the number of current samples of said received signal and the number of samples of each of said at least two replica code sequences is N, and wherein the number of available replica code sequences is K+1;
wherein the employed code is a binary code using sample values of +1 and −1, the current samples of a received signal being denoted as: $x_{N-1}, x_{N-2}, \ldots, x_3, x_2, x_1, x_0$ and the samples of the replica code sequences being denoted as: $r_{N-1}^k, r_{N-2}^k, \ldots, r_3^k, r_2^k, r_1^k, r_0^k$ with k=0 to K;
wherein $2^K$ groups $J_{b_1 \ldots b_K}$ are defined, $b_1 \ldots b_K$ being a notation of sign changes of the samples of said replica code sequences except for a first one of said replica code sequences compared to the samples of said first replica code sequence for a respective group, all samples being associated by their position to a respective group, and wherein a sample of said received signal at a specific position j is part of a group $J_{b_1 \ldots b_K}$, if $(r_j^0 r_j^1 \ldots r_j^K) = \pm(1, b_1, \ldots, b_K)$;
wherein said preliminary result for each group is determined to be $$S_m = \sum_{j \in J_{b_1 \ldots b_K}} r_j^0 x_j,$$

where $m = (m1, \ldots, m_K) = 0, 1, \ldots, 2^K - 1$ is reserved for indexing the groups $J_{b_1 \ldots b_K}$ with $$m_p = \begin{cases} 1 & b_p = 1 \\ 0 & b_p = -1 \end{cases}$$

and p=1 ... K;

wherein for said first replica code sequence, the correlation value is determined to be $$C^0 = \sum_{m=0}^{2^K - 1} S_m;$$

and wherein for the $k^{th}$ replica code sequence, with k=1, ..., K, the correlation value is determined to be $$C^k = \sum_{m=0}^{2^K - 1} b_k S_m,$$

where for each $m = (m1, \ldots, m_K)$, $b_k$ is defined to $$b_k = \begin{cases} 1 & m_k = 1 \\ -1 & m_k = 0 \end{cases}$$

for the $k^{th}$ replica code sequence.

6. The method according to claim 1, wherein it is determined whether a sample at a particular position in said received signal is associated by its position to a particular group by evaluating the composition of the values of the samples of said at least replica code sequence at said particular position.

7. The method according to claim 6, wherein the employed code is a binary code, and wherein said composition of the values of the samples of said at least replica code sequence at said particular position is evaluated by means of an AND logic.

8. The method according to claim 1, wherein said signal received at a receiver is a signal transmitted by a satellite of a satellite positioning system.

9. A processing unit for determining the correlation between samples of a code modulated signal received at a receiver and samples of at least one available replica code sequence, the samples of said received signal and of said at least one replica code sequence being aligned to each other, wherein the positions of said samples in said received signal and in said at least one replica code sequence are grouped, each group comprising all positions at which the composition of the values of the samples of all of said at least one replica code sequence is similar, said unit comprising:
 a first combining portion for combining the values of the samples of a received signal which are associated by their positions to a respective group separately for each group to obtain a respective preliminary result; and
 a second combining portion for determining a correlation value for each of said at least one replica code sequence by combining preliminary results provided by said first combining portion for all groups separately for each of said at least one replica sequence taking into account the values of the samples of said at least one replica sequence in the respective group;
 wherein said processing unit is configured to use said correlation value for each of said at least one replica code sequence to determine the correlation between each of said at least one replica code sequence and samples of said recieved signal.

10. The processing unit according to claim 9, wherein said processing unit is a correlator.

11. The processing unit according to claim 10, wherein said processing unit is a matched filter.

12. The processing unit according to claim 9, wherein said processing unit is said receiver receiving said code modulated signal.

13. The processing unit according to claim 9, wherein said processing unit comprises a receiving component for receiving said samples of a signal received at said receiver from said receiver.

14. A system for determining the correlation between samples of a code modulated signal received at a receiver and samples of at least one available replica code sequence, the samples of said received signal and of said at least one replica code sequence being aligned to each other, wherein the positions of said samples in said received signal and in said at least one replica code sequence are grouped, each group comprising all positions at which the composition of the values of the samples of all of said at least one replica code sequence is similar, said system comprising:
 a first combining portion for combining the values of the samples of a received signal which are associated by their positions to a respective group separately for each group to obtain a respective preliminary result;
 a second combining portion for determining a correlation value for each of said at least one replica code sequence by combining preliminary results provided by said first combining portion for all groups separately for each of said at least one replica sequence taking into account the values of the samples of said at least one replica sequence in the respective group; and
 a correlator for using said correlation value for each of said at least one replica code sequence to determine the correlation between each of said at least one replica code sequence and samples of said recieved signal.

15. A processing unit for determining the correlation between samples of a code modulated signal received at a receiver and samples of at least one available replica code sequence, the samples of said received signal and of said at least one replica code sequence being aligned to each other, wherein the positions of said samples in said received signal and in said at least one replica code sequence are grouped, each group comprising all positions at which the composition of the values of the samples of all of said at least one replica code sequence is similar, said unit comprising:
 means for combining the values of the samples of a received signal which are associated by their positions to a respective group separately for each group to obtain a respective preliminary result;
 means for determining a correlation value for each of said at least one replica code sequence by combining preliminary results provided by said means for combining the values of the samples of the received signal for all groups separately for each of said at least one replica sequence taking into account the values of the samples of said at least one replica sequence in the respective group; and
 means for using said correlation value for each of said at least one replica code sequence to determine the correlation between each of said at least one replica code sequence and samples of said received signal.

16. A computer program product comprising a computer readable storage structure embodying a computer program code thereon for execution by a compute processor, wherein said computer program code comprises instructions for performing the method according to claim 1.

* * * * *

UNITED STATES PATENT AND TRADEMARK OFFICE
CERTIFICATE OF CORRECTION

PATENT NO. : 7,277,476 B2  Page 1 of 1
APPLICATION NO. : 10/406152
DATED : October 2, 2007
INVENTOR(S) : Akopian It is certified that error appears in the above-identified patent and that said Letters Patent is hereby corrected as shown below:

In column 13, line 61, claim 4, line 24 "-" should be deleted

In column 14, line 12, claim 5, line 12 " $J_{b...b_k}$ " should be -- $J_{b_1...b_k}$ --

In column 14, line 30, claim 5, line 27 "ml" should be -- $m_1$ --
In column 14, line 57, claim 5, line 48 "ml" should be -- $m_1$ --
In column 15, line 8, claim 7, line 5 "AND" should be -- XOR --

Signed and Sealed this

Twenty-second Day of July, 2008

JON W. DUDAS
*Director of the United States Patent and Trademark Office*